United States Patent [19]

Houghton et al.

[11] Patent Number: 4,895,003
[45] Date of Patent: Jan. 23, 1990

[54] ABSORBER-TYPE HEAT PUMP

[75] Inventors: Fred Houghton, Hartlepool; Paul Holmes, Hartburn, both of Great Britain

[73] Assignee: Foster Wheeler Energy Limited, Great Britain

[21] Appl. No.: 207,807

[22] Filed: Jun. 17, 1988

[30] Foreign Application Priority Data

Jun. 19, 1987 [GB] United Kingdom ............ 8714423

[51] Int. Cl.⁴ ............................................. F25B 15/00
[52] U.S. Cl. ........................................ 62/476; 62/483
[58] Field of Search .................................. 62/483, 476

[56] References Cited

U.S. PATENT DOCUMENTS

| | | | |
|---|---|---|---|
| 3,046,756 | 7/1962 | Whitlow et al. | 62/483 X |
| 3,293,881 | 12/1966 | Walker | 62/476 |
| 4,619,119 | 10/1986 | Dijkstra et al. | 62/476 X |
| 4,679,409 | 7/1987 | Fitt | 62/483 X |

Primary Examiner—Lloyd L. King
Attorney, Agent, or Firm—Marvin A. Naigur; Warren B. Kice; Randall C. Brown

[57] ABSTRACT

An absorber/solution pump for pumping strong concentration liquor up a pressure gradient to a vapor generator in a heat-pump system, said pump comprising a pump body defining a first vertically disposed cylinder and housing a first piston which reciprocates within said cylinder, dividing it into an upper pumping chamber and a lower working chamber, a header tank for the system strong concentration solution integral with said pump body and surmounting said pumping chamber, said header tank and said pump body being interconnected via a one-way valve which allows the strong-concentration solution to be drawn by suction and gravity into the pumping chamber, a second piston within a second cylinder which is connected to the first piston so as to reciprocate with it, said second cylinder opening at the bottom into the pumping chamber and opening at the top into the base of the header tank, and a third piston acting vertically in a third cylinder which is closed at the bottom from the atmosphere but is selectively connected to the heat pump system and opens at the top into the working chamber, said third piston acting through an extension so as to reduce the loading on the underside of the first piston when the latter undergoes a return stroke.

13 Claims, 3 Drawing Sheets

ABSORBER-TYPE HEAT PUMP

The present invention relates to absorption type heat pumps containing a solution pump. More particularly it relates to improvements in the physical relationship of the absorber and the solution pump and to modifications in the latter.

In the heat transferring system to which this present invention relates a vapor is circulated from a generator through a condenser where it enters a liquid phase and then through an evaporator to become a vapor again from whence it passes into an exothermic, liquid-based, absorber. The liquid of the absorber has an affinity for the vapor and is used as the transporting medium to convey the vapor up a pressure gradient to the aforesaid generator. To enable this to be done a pressure driven reciprocating pump is connected between the absorber and the generator to pump the high concentration liquid from the absorber to a rectifying column forming part of the generator. The pump is driven from the differential pressure maintained between the generator and the absorber and for this purpose there is a secondary loop branching to the driving chamber of the pump from the generator through which a weak concentration liquid is conveyed down the pressure gradient to the absorber. The power to run the system comprises the heat supplied to the generator.

In the prior art arrangements the pump was arranged in the apparatus in such a manner that it and the absorber were spaced apart, the latter being situated in an independent circulating loop and a high concentration liquid being drawn from the loop by the pump downstream of the absorber, through branch ducting, usually containing one or more uni-directional valves. This arrangement encouraged the formation of vapor locks in that, due to fluid friction in the ducting and valves and a localized depression caused as a pump draws the liquor into its pumping chamber, the vapor tended to come out of solution and partly fill the pump and the ducting, thereby reducing the effectiveness of the pump and this tendency was aggravated by an inappropriate disposition and the orientation of the pump. In the arrangement described in accordance with the invention a tank which is functionally part of the aforesaid absorber loop is positioned immediately above a vertically acting solution pump and in the preferred embodiment is defined by a chamber within the pump and constitutes an integral part thereof. The high concentration low pressure solution enters directly into this tank. From the base of the tank the pump drawn liquor downwards into its pumping chamber, thereby minimizing any formation of vapour.

Accordingly the invention provides an absorber/solution pump arrangement within a closed heat pump system wherein the pump is arranged so that its pumping chamber is swept vertically and the pump is provided with a tank immediately above the pumping chamber in which there is maintained a head of strong concentration liquor and from which liquor is drawn into the pumping chamber of the pump in a generally downward direction, said tank forming part of a naturally circulating loop which includes an absorber and is downstream thereof. The pump has a working chamber situated below the pumping chamber which has an input/output port through which it receives, as the working fluid, relatively weak concentration high-pressure liquor from the vapor generator. The fluid is exhausted from the chamber, through the same port, to a low-pressure point in the said chamber loop. In a preferred arrangement the said tank incorporates a saturated vapour space above the head of strong liquor and means are provided for preventing the liquid level from rising above a predetermined level within this space. The pump chamber un-swept volume is minimised and its outlet is arranged at the highest point in the chamber.

Hereinafter the invention is further described in relation to the known operating system and by way of example having regard to the accompanying drawings, wherein.

Figure 1:
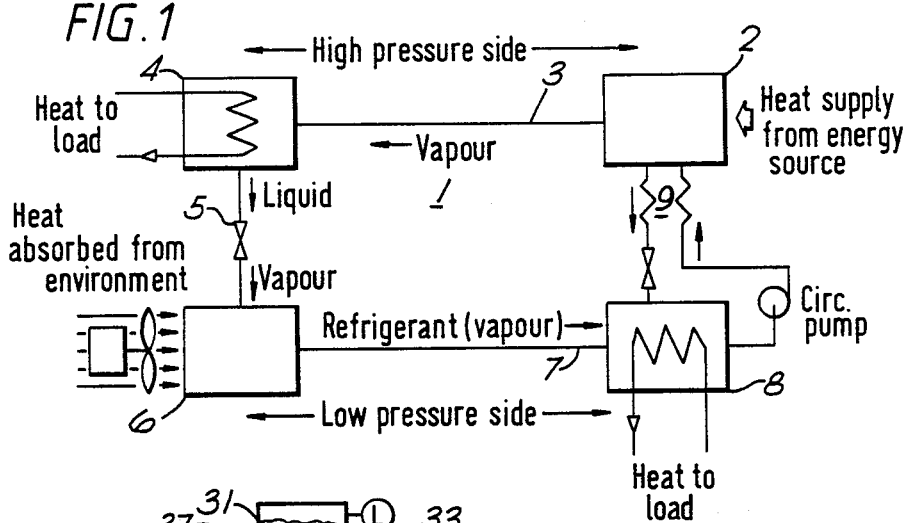
FIG. 1 shows the basic vapor absorption heat transfer system.

Referring to FIG. 1, in the heat transfer system 1 vapor is generated by the application of heat to a solution in the generator 2 whence the vapor thus formed flows along duct 3 to a condenser 4. Heat is removed from the vapor in the condenser whereby the vapor changes into its liquid phase. The cooled liquid phase is depressurised in the expansion valve 5 leading to an evaporator 6 at which stage heat is absorbed from the environment thereby revaporising the liquid. Environmentally heated vapor then passes along duct 7 into an absorber 8 where it is dissolved into an absorbent liquid. THis absorption is an exothermic reaction and heat is generated which must be removed from the liquid to permit the absorption of vapor into the liquid to continue, thus causing the concentration strength of the liquor to rise. Finally a high-concentration liquor is pumped from the absorber, which is at relatively low pressure, to the generator which is at a much higher pressure. The low-concentration liquid formed in the generator by the separation of the vapor therefrom is introduced into the upstream side of the absorber 8 through a heat exchanger 9 where it gives up heat to the high-concentration liquor being pumped to the generator 2.

Figure 2:
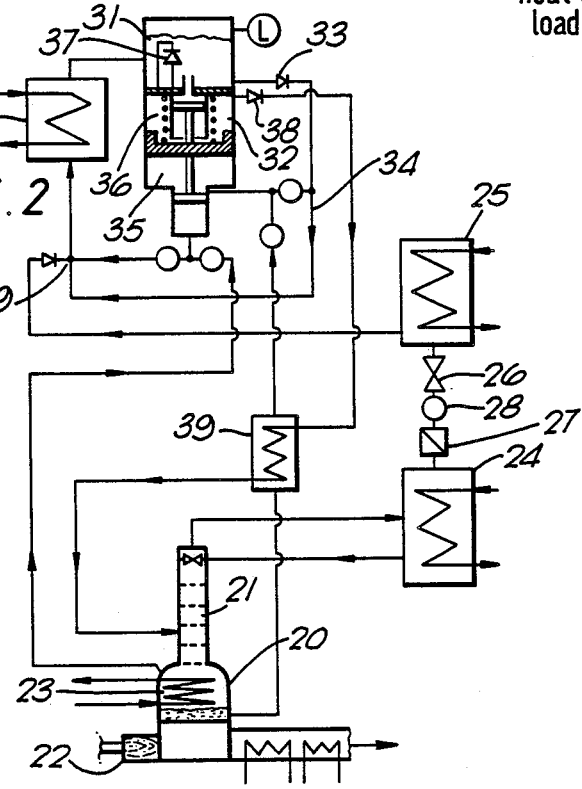
FIG. 2 is a schematic diagram of the heat transfer system according to the invention.

Referring now to FIG. 2, there is shown a schematic example of a heat transfer system according to the invention. Generator 20 is coupled to a rectifying column 21 wherein vapor rising from the generator is purified. The generator and rectifying column can be of conventional design and contain conventional heat sources and sinks 22, 23 respectively. The generated vapor rises through the column 21, emerges from the top thereof as a relatively pure vapor and passes into the condenser 24 where it is converted into its liquid phase by the removal of heat. Some of the liquid is returned to the upper level of the rectifying column where it forms the natural liquid-phase condensate supply therefor. The remainder of the liquid phase condensate passes to an evaporator 25, via a filter 27, a solenoid-operated control valve 28 and an expansion valve 26, where it is converted back into a vapor at low pressure by absorbing heat from the environment. The vapor at low pressure and at environmental temperature then enters a junction 29 at the inlet of an absorber 30 where it joins a circuit containing a solution of the vapor which is naturally circulating therein.

Junction 29 is thus part of a natural circulation path which includes this junction, the absorber 30, a tank 31 situated above a pump 32 and being physically integrated, therewith, said tank functioning as a reservoir for the strong solution, a one-way valve 33 and a loop 34 which joins the junction 29. The latter loop also contains a liquid which has been diluted by a weak concentration liquid ejected from the working chamber 35 of the pump 32 during a recovery stroke. The absorber 30 is arranged vertically above the junction 29 so that the vapor entering this junction from the evaporator 25 forms bubbles which rise through the solution whilst the latter is in the absorber and cause an upward liquid flow therein partly as a consequence of the movement of the bubbles and partly due to gravitational influence as a consequence of the higher concentration liquors formed at ascending levels in the absorber having lower densities than the low concentration liquor at the bottom thereof. This movement of liquid is responsible for the natural circulation around the aforesaid loop and is assisted by the removal of heat from the absorber wherein an exothermic reaction takes place as the vapor enters into solution in the liquid.

High concentration liquor is drawn into the pumping chamber 36 of the pump 32 from the holding tank 31 via a one-way valve 37, and during a pump upward stroke this liquor is forced via another one-way valve 38 and a heat exchanger 39 into the lower levels of the rectifier column 21 from whence it drains into the generator 20 and gives up its vapor content. In FIG. 2 the elements represented by circles are all solenoid operated gate valves which are sequentially controlled by an external control system (not shown).

Figure 3:
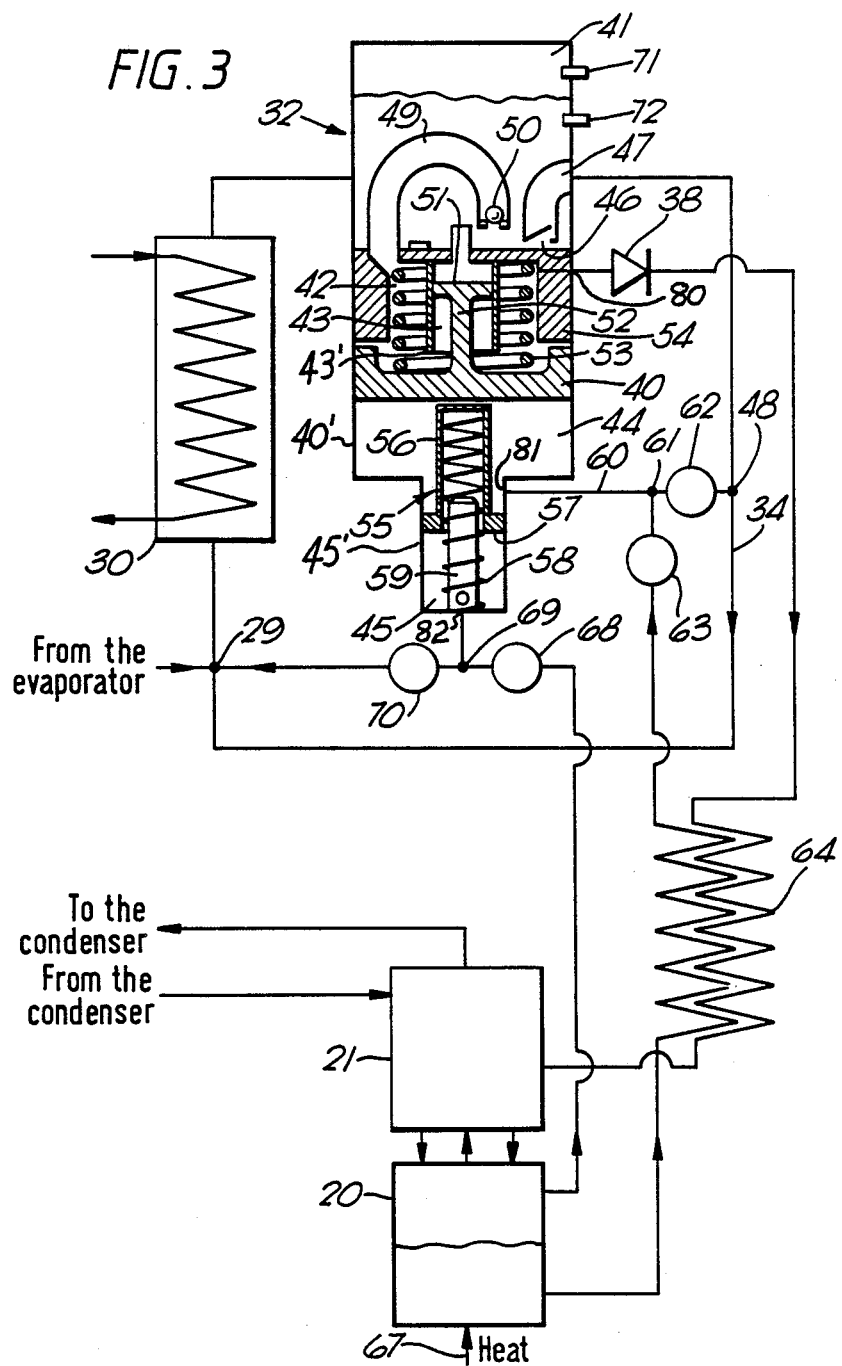
FIGS. 3 and 4 show schematically specific embodiments of the absorber heat pump arrangement according to the invention.
Figure 4:
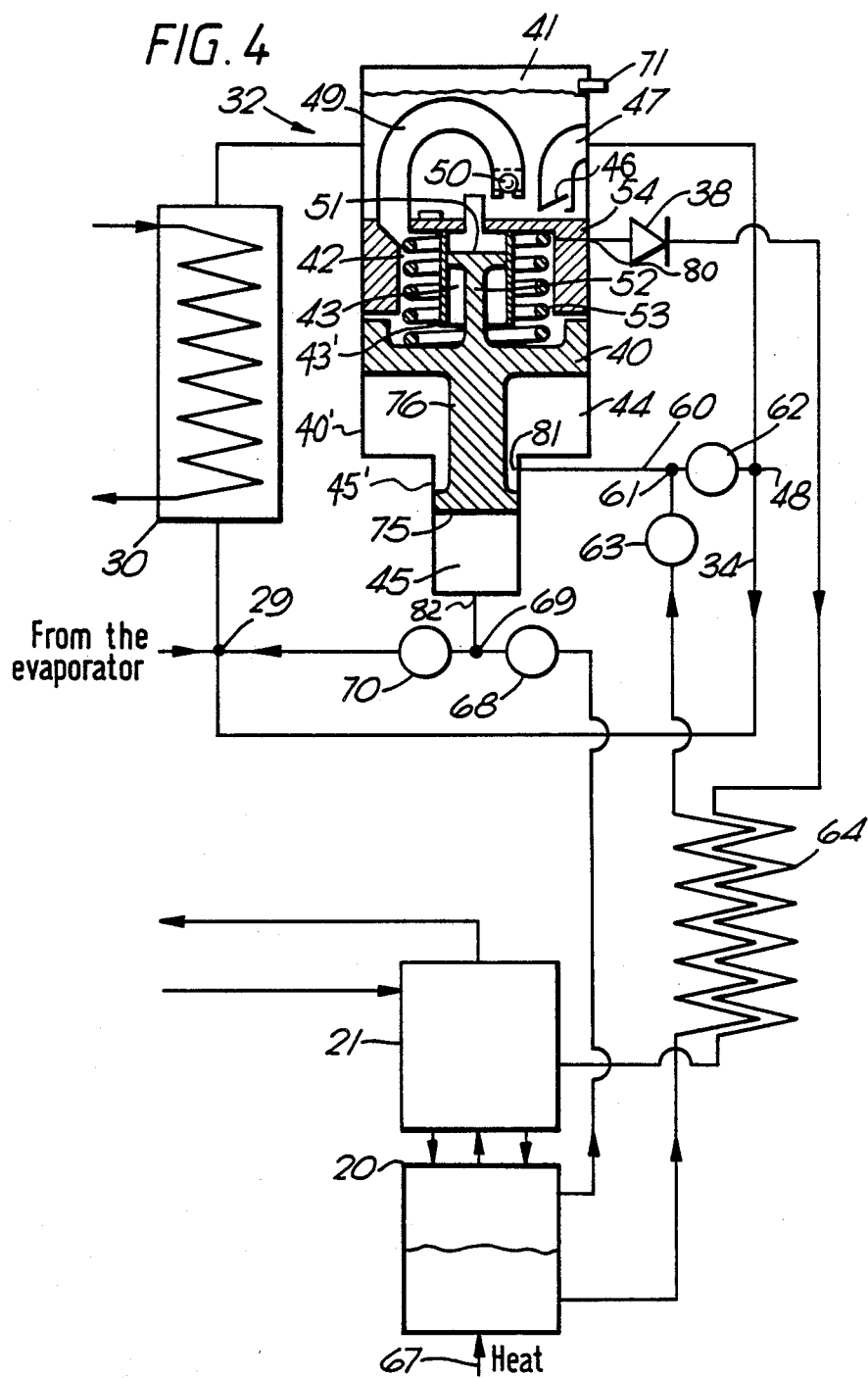

Two specific embodiments of pump 32 are disclosed in greater detail respectively in FIGS. 3 and 4 together with the immediately associated parts of the relevant system. Referring specifically to FIG. 3, the pump 32 comprises a series of vertically arranged chambers 41, 42, 43, 44, 45, the top one of which (41) consisting of a tank corresponding to the previously mentioned tank 31 of FIG. 2 and functionally comprising part of the absorber.

The chamber 41 has a fixed volume. Low pressure liquid circulation passes directly from absorber 30 through the chamber 41 and through a one-way flap valve 46 at the base of a normally submerged pipe 47, whence it passes into the loop 34 via a junction 48. Chamber 42 has its volume defined by a operating in a first cylinder 40 and communicates with chamber 41 through another normally submerged pipe 49 which is fitted with a one-way ball valve 50. This valve operates at a very low pressure differential and permits a flow of fluid only from the chamber 41 into the chamber 42. The latter has an outlet port 80 at its upper boundary connected to the one-way valve 38 which will only permit fluid to flow away from the pump. The chamber 42 surrounds a coaxial second cylinder 43′, defining an inner chamber 43 containing a piston 51 which is physically connected through a rod 52 to the piston 40. Chamber 43, opens at its top into chamber 41 and it opens at its bottom into chamber 42. Chamber 42 contains a compression spring 53. A collar 54 surrounds the spring 53 to minimise the unswept volume of chamber 42. The enclosed chamber 44 has an upper boundary defined by piston 40 and a lower boundary defined by a displacer 55. The latter comprises a blind hollow tube 56 coupled at its base to a piston 57 which slides in a chamber 45 defined by a third cylinder 45′ and is normally urged towards the piston 40 by means of a weak spring 58 supported by a post, 59. Chamber 44 has an inlet/outlet port 81 coupled through a duct 60 to a junction 61 connected on the one hand to a solenoid valve 62 and on the other hand to a solenoid valve 63. Solenoid valve 62 connects to junction 48. One-way valve 38 connected to outlet port 80 couples the first channel of a heat exchanger 64 to the exhaust fluid of chamber 42, the outlet of which channel comprises the normal, high-concentration-liquor high-pressure input to the lower levels of rectifier column 21. A second channel of heat exchanger 64 normally receives a high pressure weak liquor input from a generator 20 and its outlet is connected to the inlet of the solenoid valve 63. Vapor generated in generator 20 is ducted into the base of the rectifier column 21 and the weak liquor draining from the rectifier column is ducted back into the generator 20. A heat source 67 applies heat to the generator 20. Vapor from the rectifier column is fed to the condenser 24 (see FIG. 2) where it is converted into its liquid phase. The resultant condensate is then passed to evaporator 25 (see FIG. 2) where latent heat addition returns it to vapor phase. This vapor joins the absorber loop at junction 29. High pressure vapor generated in generator 20 is coupled to the chamber 45 via a solenoid valve 68, junction 69 and inlet/outlet port 82. The chamber 45 is also connected via port 82, junction 69 and a solenoid valve 70 to to junction 29. The system as described operates in the following manner.

Assume at the start of a cycle of operation the piston 40 rests on the floor of the chamber 44 and chamber 42 is filled with low pressure high concentration liquor from the chamber 41. It will be seen that the displacer 55 will be in its bottom position, the weak spring 58 being compressed by virtue of the force exerted by the strong spring 53. Assume also that solenoid valve 62 is closed, solenoid valve 63 is open, solenoid valve 68 is open, and solenoid valve 70 is closed. The pressure in the generator 20 is thus coupled to the interior of chamber 44 and weak concentration liquor flows therein via heat exchanger 64 under this pressure. This pressure exerts a greater loading on the underside of the piston 40 than the loading on top of the piston 40 resulting from the head of pressure communicated to the chamber 42 via the ball valve 50, and the loading caused by the strong spring 53 and the pressure on top of the piston 51. Piston 40 is thereby urged upwards. As soon as it moves the pressure in chamber 43 rises and without the piston 51, piston 40 would be halted as soon as the pressures equalised on its two sides. However, because chamber 43 communicates directly with chamber 42, piston 51 experiences a differential pressure which forces it upwards, pulling piston 40 upwards with it. This further increases the pressure in chamber 42 so that it exceeds that of the generator 20. The reduction in volume of chamber 42 expels the fluid therein, which has been derived from the chamber 41, under pressure through the one-way valve 38 and the heat exchanger 64 into the generator 20.

At the same time as liquid from the generator 20 is admitted to chamber 44, vapor from the generator 20 is admitted into the chamber 45 through the solenoid valve 68, thereby forcing the displacer in an upward direction as a consequence of the loading of spring 58, the pressures of the fluids on chambers 44 and 45 being equal, having originated from the same source. At some stage during the upward stroke of the piston 40 solenoid 68 is closed, thereby halting the upward movement of displacer 55. At the end of the stroke of piston 40 the solenoid valve 63 is closed and subsequently the two solenoid valves 62 and 70 are opened. The piston 40 descends to the floor of chamber 44, together with the displacer 55 driven by the previously compressed spring 53. The contents of both chambers 44 and 45 are expelled respectively through the solenoid valves 62 and 70 and the junction 29 to the absorber 30. This action results in the natural circulation through the absorber being enhanced. Flow of fluid from the solenoid valve 62 directly into the chamber 41 is prevented by the flap valve 46 which will only permit flow in the opposite direction.

As piston 40 descends the volume of chamber 42 increases, which results in an immediate flow of liquor from chamber 41 through the ball valve 50 into the chamber 42. High concentration liquor from chamber 41 also flows into chamber 43 as the piston 51, which is coupled to piston 40, descends. When piston 40 reaches its bottom-most position solenoid valves 62 and 70 close. Solenoid valves 63 and 68 are subsequently opened so as to recommence the cycle of operation.

Though the system is a closed one, the volumes of liquid in the chamber 41 and the generator 20 may distribute unevenly and the volume of vapor in chamber 41 change as a consequence of a change in the heat transfer balance of the system. Normally, the liquid displacement above and below the piston 40 must be equalised and displacer 55 takes up a position during the upward stroke of piston 40 to provide the balance. However, the liquid flow may be unbalanced temporarily by controlling the displacement of displacer 55, in order to redistribute the volumes. To prevent the liquid in chamber 41 from becoming so low that vapor instead of liquid is drawn into the pumping chamber 42 or so high that the vapor space in chamber 41 becomes too small, liquid level sensors 71, 72 are provided in chamber 41. These provide signals to the controller system (not shown) whenever the level moves out of limits. In the controller this signal is used to control the operation of the solenoids 68 and 70 and therefore to control the movement of the displacer 55. In normal operation the displacer would only follow the piston through part of its stroke and would then be halted by the closure of the solenoid valve 68. Altering the instant of closure of the latter valve in the respective direction would allow more of less liquid as required to be transferred from the system into the chamber 41, thereby controlling its level.

In all other repects the system operates as discussed in relation to FIG. 2.

By ensuring that the liquid level in chamber 41 remains above the ball valve 50 and by providing the exhaust outlet from chamber 42 at the highest possible position within the latter and also by reducing the unswept volume thereof as much as possible the danger of vapor locks forming in the system and particularly in the pumping chamber 42 is eliminated and the pump is made self-priming.

Referring now to FIG. 4, there is shown a modified form of pump 32. The main difference between the two pumps is that in the pump of FIG. 4 the displacer is no longer an independent unit but instead it takes the form of a piston 75 corresponding to piston 57 which is connected to piston 40 through a rod 76 so that the pistons 75, 40 and 51 are integral and all move in unison. Moreover, the weak spring 56 and the post 59 are omitted, as is also the low level liquid sensor 72. In all other respects the system is identical to that of FIG. 3 and the same reference numerals are used for corresponding parts throughout these Figures.

The purpose of the displacer 55 of FIG. 3 was to provide a means for controlling the swept volume of chamber 44 so that the rate at which liquid was transferred through the absorber to the tank 41 could be controlled.

In the embodiment of FIG. 4 the swept volumes of chambers 42 and 44 are of fixed volumes. Hence, so long as both chambers only contain liquid, the liquid displacements in the system remain in balance. Any excess vapor is allowed to accumulate in chamber 41 and should it happen that the level of liquid drops below the inlet ball valve 50 some vapor will be drawn into chamber 42. This reduces the amount of liquid displaced from the chamber, relative to the displacement of liquid in chamber 44 which in turn will tend to restore the liquid level in chamber 41. If on the other hand the liquid accumulates in chamber 41, the controller operates in response to a signal from the level sensor 71 to actuate the solenoid valves 62, 63, 68 and 70 in such a manner that the pump speed increases. This has the effect of transferring liquid from the natural circulation loop to the generator 20.

We claim:

1. A closed circulatory heat-pump system comprising vapor generator means;
absorber means; and
absorber/solution pump means comprising a pump having a body containing a pumping chamber and a working chamber, said pumping chamber being separated from said working chamber by a reciprocating piston, said pumping chamber being positioned above said working chamber and exhausting its contents to said vapor generator means; a tank for storing relatively strong concentration low-pressure liquor, said tank being situated immediately above said pumping chamber wherein liquor is drawn from said tank by said pump directly into said pumping chamber in a generally downward direction; and a gravity-actuated series circulatory loop external to said pump;
wherein said tank is disposed at the high point ins aid gravity-actuated series circulatory loop, said loop including said absorber means upstream of said tank and a system vapor input at the inlet to said absorber means, and
wherein said working chamber of said pump has an inlet/exhaust port through which it receives, as the working fluid, relatively weak concentration high-pressure liquor from said vapor generator means and through which it exhausts its working fluid to a low-pressure point in said gravity-actuated circulatory loop.

2. An absorber/solution pump according to claim 1 wherein said first piston is biased in a downward direction by a compression spring contained in an unswept volume of said pumping chamber, which volume is minimized by a thickened cylindrical wall of said first cylinder whereby the internal diameter thereof is reduced to less than the diameter of said first piston.

3. A heat pump system according to claim 1 wherein said tank is integral with said pump body and communicates with said pumping chamber through a passage containing a low-differential-pressure-actuated one-way valve, said valve allowing strong concentration liquor to flow from said tank into said pumping chamber under the action of gravity and preventing the release of vapor in said chamber and reverse flow therethrough.

4. A heat pump system according to claim 3 wherein said pumping chamber has an exhaust port situated at the highest elevation of its chamber, said exhaust port being coupled to a liquor input of said vapor generator means.

5. A heat pump system according to claim 1 wherein said pumping and working chambers of said pump are defined by a first vertical cylinder and are separted by a first piston vertically reciprocating therein which piston is connected to a smaller diameter second piston operating in a second cylinder which opens at its bottom end into the pumping chamber and opens at its top end into the base of the said tank, and wherein said first piton is biased downwards by a compression spring.

6. A heat pump system according to claim 5 wherein said working chamber comprises displacer means connected to a third piston operating in a chamber defined by a third cylinder, said third cylinder opens at its top end into said working chamber and having an inlet/exhaust port at its bottom end but being otherwise closed at its bottom end, and being selectively connected to the said circulatory loop, said displacer means reciprocating in said third cylinder whereby the loading on the under side of said first piston is reduced at the end of a working stroke.

7. A heat pump system according to claim 6 wherein each of said inlet/exhaust ports of the respective working and displacer means chambers comprise controlled valves which are operated by system control means at appropriate instances in each operating cycle of said pump, said working and displacer means chambers being separately connected to respectively receive inputs from the liquid and vapor phases of said vapor generator means, and both said working and displacer means chambers being connected to exhaust to the inlet of said absorber means, which absorber means inlet is also connected to receive vapor from an evaporator.

8. A heat pump system according to claim 7 wherein said tank is closed from the atmosphere and is provided with means for detecting the level of liquor in said tank, said system control means actuating said controlled valves whereby the level of liquor in said tank is maintained with respect to at least one prescribed limit.

9. An absorber/solution pump for a heat pump system comprising a pump body, a first cylinder and a first piston wherein said pump body houses said first cylinder and said first cylinder is swept by said first piston, said first piston dividing said first cylinder into an upper pumping chamber and a lower working chamber, said pump body further comprises an integral, closed tank surmounting said pumping chamber and communicating therewith through a passage in the floor of said tank, said passage having a low differential-pressure-actuated one-way valve permitting fluid flow only from said tank to said pumping chamber, said tank having an inlet for receiving strong concentration liquor from said absorber means and an outlet for connection to a gravity-actuated circulation loop coupled to said absorber means, said outlet comprising a one-way valve, and said pumping chamber having an exhaust outlet port comprising a one-way valve, which outlet port communicates with said pumping chamber at a high point thereof.

10. An absorber/solution pump according to claim 9 wherein said first piston is normally biased downwards by a compression spring and is connected to a second piston operating in a second cylinder within said pump body, said second cylinder opening at its top end into the floor of said tank and opening at its bottom end into said pumping chamber.

11. An absorber/solution pump according to claim 10 wherein said pump body further defines a third cylinder swept by a third piston which mechanically couples to the base of said first piston, said third cylinder opening into and depending from the base of said first cylinder and being closed at the bottom end, wherein said first cylinder has an inlet/exhaust port within said working chamber for receiving and exhausting the working fluid, and said third cylinder has an inlet/exhaust port below said third piston for receiving the vapor phase of an associated vapor generator means and exhausting said fluid to a low pressure point in the associated system.

12. An absorber/solution pump according to claim 11 wherein said third piston is independent of said first piston, acting thereon mechanically through an extension, and is normally biased upward towards said first piston by a relatively weak spring.

13. An absorber/solution pump according to claim 11 wherein said third piston is mechanically connected to the base of said first piston via an extension rod.

* * * * *